United States Patent

Penny

[15] 3,643,620
[45] Feb. 22, 1972

[54] MULTICOLOR INDICATOR FOR A FLUID OPERATED SYSTEM

[72] Inventor: Peter A. Penny, Stratford, Conn.
[73] Assignee: Remington Arms Company, Inc., Bridgeport, Conn.
[22] Filed: Sept. 8, 1969
[21] Appl. No.: 856,115

[52] U.S. Cl. ..............................116/65, 137/87, 137/551, 137/625.18
[51] Int. Cl. .............................................G08b 1/04
[58] Field of Search...............116/65, 70, 129, 117, 124, 116/114, 4; 137/557, 81.5, 82, 83, 87, 551, 625.18

[56] References Cited

UNITED STATES PATENTS

| 2,034,373 | 3/1936 | Bilde | 116/65 |
| 2,644,939 | 7/1953 | Ebel et al. | 116/114 X |
| 3,038,439 | 6/1962 | Martin et al. | 116/117 |
| 3,447,555 | 6/1969 | Jenney | 137/82 |
| 3,490,408 | 1/1970 | Monge et al. | 116/70 X |
| 1,064,911 | 6/1913 | Jarvis | 40/130 N |

FOREIGN PATENTS OR APPLICATIONS

| 1,380,388 | 10/1964 | France | 116/65 |
| 372,725 | 12/1963 | Switzerland | 116/129 |

Primary Examiner—Louis J. Capozi
Attorney—D. Verner Smythe

[57] ABSTRACT

A visual indicator comprises a rotatably mounted body having three different positions and colors painted over a 120° ortion of the body peripheral surface and vanes on each end of the body. A fluid flow acting upon the vanes on one end rotates the body in one direction through an angle of 120° so that a predetermined color is visible in a viewing window. Fluid flow on the vanes at the other end of the body rotates the body 120° in the other direction so that another color is visible in the viewing window. The body is weighted so as to remain in its normal position when there is no flow.

1 Claims, 5 Drawing Figures

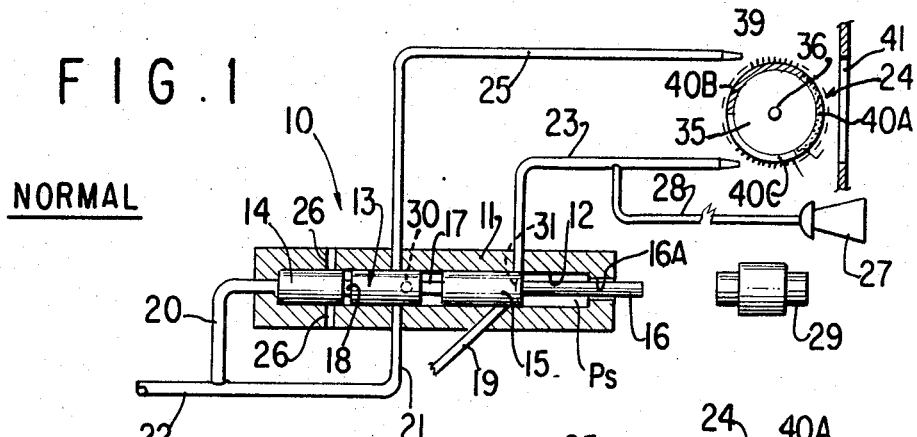
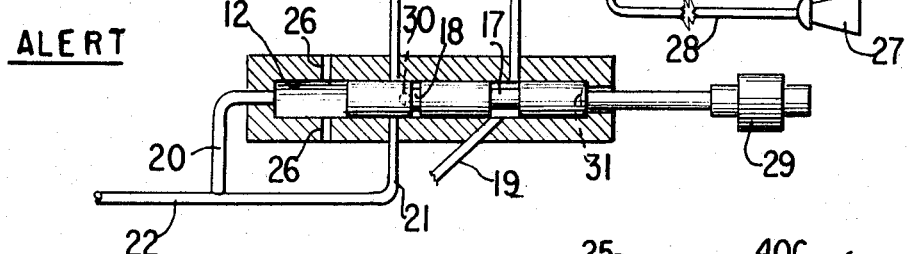
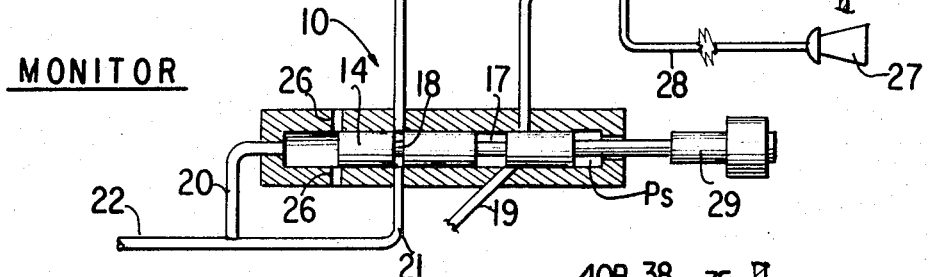
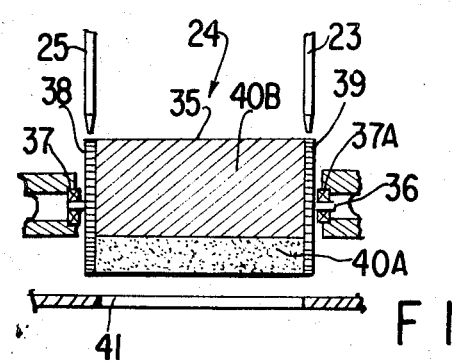

MULTICOLOR INDICATOR FOR A FLUID OPERATED SYSTEM

This invention relates to indicators for a fluid flow system.

Industrial control systems in many different industries have commonly used annunciators for providing information on a process or operation to an operator. A process or operation variable may have a limit or range predetermined as being acceptable for normal operation. If the variable or condition exceeds the limit or range, then the process is considered to be in an abnormal or trouble condition. Generally, the variable is measured by a suitable sensing device to produce an analog output that is a function of the value of the variable being monitored. When the variable exceeds the predetermined limit or range, a precision limit switch will transmit a signal to the air annunciator. The presence of this signal denotes an abnormal condition and indicates trouble or some sort. When a trouble signal is noted, the operator will generally acknowledge the existence of this signal and then take the necessary remedial steps which have been determined beforehand.

While such annunciator systems have been generally electronic in nature, attempts have been made to devise fluidic and pneumatic annunciator systems. The fluidic and pneumatic annunciator systems include as they components fluidic and pneumatic annunciator devices, respectfully, and an indicator actuated in response to the logic of the annunciator device. As an example, such annunciator systems generally indicate one of three conditions which include alert, monitor and normal. While various forms of indicators have been proposed, they have been generally unsatisfactory in that they were either slow to respond or did not clearly indicate the condition sensed by the system.

One of the objects of the present invention is to provide an indicator for a fluid system.

Another object of the present invention is to provide an indicator for a fluid system which is readily responsive to the conditions sensed by the system and clearly indicates this condition.

Still another object of the present invention is to provide an indicator for a fluid system having a large ratio of indicator area to mounting area.

According to one aspect of the present invention, a visual indicator for a fluid-operated annunciator system may comprise a body, such as a cylindrical drum, mounted for rotation about its cylindrical axis. Visual indicia means are provided on different portions of the peripheral surface of the drum. Other types of indicia can be employed. A plurality of vanes is on each end of the drum so that a flow of fluid against the vanes on one end will rotate the drum in one direction so as to position indicia means in viewing position and the flow of fluid on the vanes on the other end will rotate the drum in the other direction so as to position another indicia in the viewing position.

The visual indicia means may include three different colors with each color over an equal portion of the peripheral surface. The drum is positioned adjacent a viewing window so that one color is visible in the window at a time. The rotation of the drum in either direction may be limited to 120° so as to accurately position a color in viewing position. Means may be provided on the drum to retain the drum in the normal position.

Other objects, advantages and features of the present invention will be apparent from the accompanying description and drawings, which are merely exemplary.

In the drawings:

FIG. 1 is a longitudinal sectional view of an annunciator device in a pneumatic annunciator system with the outputs leading to an indicator according to the present invention and the piston valve member of the device being shown in the normal position;

FIG. 2 is similar to FIG. 1 but shows the annunciator device valve member in the alert position and the indicator in the corresponding position;

FIG. 3 is similar to FIG. 1 but shows the annunciator device valve member in the monitor position and the indicator in the corresponding position;

FIG. 4 is a top plan view of the indicator according to the present invention and showing the viewing window; and FIG. 5 is an end elevational view of the indicator as shown in FIG. 4.

Proceeding next to the drawings wherein like reference symbols indicate the same parts throughout the various views, a specific embodiment of the present invention will be described in detail. It is to be understood although the invention is particularly adopted for pneumatic systems, that fluid includes liquid as well as gas.

The indicator may be used with various systems but will be described in conjunction with its use with a specific system having two signal outputs.

As may be seen in FIG. 1, the annunciator device of the present invention is indicated generally at 10 and comprises a cylindrical casing 11 having a substantially cylindrical bore 12 therein. Slidably mounted within the bore is a valve member in the form of a piston 13 having a head end 14 and rod end 15 from which extends a rod 16 through an opening 16A in an end wall of the casing. The rod provides both mechanical linkage to the exterior of the casing and also a venting resistance for the fluid in that end of the bore.

The piston 13 is provided with an annular groove 17 which provides an alert or first signal output crossover and a second annular groove 18 which provides a monitor or second signal output crossover. The alert crossover enables a flow of fluid to pass through the casing bore to actuate the alert alarm, and the monitor crossover transmits the monitor signal to its alarm system. As will be subsequently pointed out, the geometry of the device presents simultaneous actuation. The casing bore has several fluid inputs and outputs which mate with the piston geometry. A constant pressure fluid conduit 19 having a pressure probably greater than 15 p.s.i.g. is connected to the casing at an angle of about 45° or less to the longitudinal axis of the piston and casing.

A second conduit 20 connects to the head end of the casing to provide an entrance for the actuation pressure or abnormal condition signal. The third conduit 21 is connected to the sidewall of the casing and also admits actuation pressure to the casing. Both conduits 20 and 21 branch from a single conduit 22 through which sensed conditions are indicated by variations in fluid pressure.

Opposed from conduit 19 is an alert conduit 23 which leads to a suitable indicator indicated generally at 24.

A monitor conduit 25 is similarly extended from the casing but opposite conduit 21 to also lead to the indicator 24.

The casing 11 is further provided with venting orifices 26 whose function will be described in connection with the operation of the device.

An acknowledge button 29 is provided which is engageable with the outer end of the piston rod 16. The operator acknowledges the existence of the alert condition by pushing the button 29 which in turn moves the piston rod a distance so that the device is in the monitor equilibrium flow in a manner to be presently described.

The visual indicator 24 of the invention comprises a cylindrical drum 35 having a shaft 36 along its central longitudinal axis and journaled at both ends at bearings 37 and 37a. A plurality of radial vanes 38 are mounted on one end of the drum 35 so as to be acted upon by the fluid flow from the conduit 25. A similar plurality of radial vanes 39 is mounted on the other end of the drum 35 so as to be acted upon by the fluid flow from conduit 23.

The peripheral surface of the drum 35 is divided into three equal areas each extending over 120° of the peripheral surface as may be seen in FIG. 1 of the drawings. These areas indicated at 40A, 40B and 40C are each of a different color.

The indicator is positioned adjacent a viewing window 41 in the wall of the apparatus and is so mounted that the colored area portions are clearly visible through the window. The drum 35 may be weighted, or some other means provided, to maintain the drum in the position shown in FIG. 1 so that the colored area 40A is visible through the viewing window 41 to indicate the normal condition. The normal condition exists when no fluid flow is discharged from either of the conduits 23 and 25.

It is pointed out that the conduits 23 and 25 are positioned on opposite sides of the rotational axis of the drum as defined by the shaft 36. Because of this relationship, a discharge from the conduit 23 will rotate drum 35 in one direction and a discharge from conduit 25 will rotate in the drum in the other direction. Suitable stops or other structure is provided in the apparatus to limit the rotation of the drum to 120° in either direction. Thus, when there is a fluid flow from conduit 23, the colored area 40C will be positioned in the viewing window 41 and, in a similar manner, a discharge from conduit 25 indicating a monitor condition will rotate the drum so that the area 40B is in the viewing window.

The sequence of operation of the device as described above will be described as follows:

Normal Condition—The pressure at conduits 20 and 21 will be atmospheric and the pressure $P_s$ in the rod end of the casing will be only a few p.s.i.g. The residual pressure from the alert supply conduit 19 will maintain the piston in the position as shown in FIG. 1. Since there is no fluid flow in either of the conduits 23 and 25, the indicator 24 will be at a static off position, and the color 40A will be in a position at the viewing window 41. This position is determined by the force of gravity acting on a properly placed mass within the cylindrical drum 35. It is pointed out that the logic of the annunciator device is such that both streams 23 and 25 will not be on simultaneously.

Sequence Actuation—Abnormal Condition—When the variable being measured exceeds a predetermined pressure, air at a pressure of the same order as the pressure in conduit 19, will approach conduits 20 and 21 through conduit 22 and move the piston.

In the trouble signal position, the alert crossover 17 becomes aligned with conduits 19 and 23 to open the alert signal path with the piston blocking flow between conduits 21 and 25. With the alert signal path open, the flow of fluid pressure through conduit 19 at an angle will urge the piston into the position shown in FIG. 2. The fluid will now flow through the alert conduit 23 to the indicator 24 to act against the vanes 39 and thus rotate the cylindrical drum 35 into the position as shown in FIG. 2 with color 40C being in the indicating position and visible through the viewing window.

Acknowledge, Trouble Gone—The operator acknowledges the alert condition by pushing the acknowledgment button 29. The button in turn pushes the piston rod a distance to place the device in the monitor equilibrium position. This return movement of the piston will turn off the alert flow through conduits 19 and 23. If the trouble signal has been eliminated at this time, then pressure $P_s$ will return the piston back to its normal position as shown in FIG. 1 and the sequence is completed.

Acknowledge, Trouble Persists—If the trouble should persist at the time of acknowledgment, then pushing in the piston rod will stop the alert flow and commence the monitor flow through conduits 21 and 25. The fluid flow through conduit 25 will position the indicator as shown in FIG. 3 with the color 40B being visible through the viewing window.

Thus, it can be seen that the present invention has disclosed a visual indicator for a pneumatic annunciator system in the form of a three-position, three-color indicator wherein one color represents the off or normal condition and the other colors each represents two distinct conditions of the system being monitored. The visual indicator may be used in conjunction with an audio indicator which sounds an alarm concurrent with the indication by the visual indicator of an alert condition.

In order to facilitate the comprehension of the present invention, the visual indicator disclosed herein has been described in connection with a particular fluid annunciator device for a monitor system. However, it is pointed out that this visual indicator may be used with many other forms of fluid monitoring systems.

It will be understood that various details of construction and arrangement of parts may be made without departing from the spirit of the invention.

What is claimed is:

1. A visual indicator for a fluid system comprising a rotatable cylindrically shaped drum, shaft means upon which said drum is rotatably mounted, circumferentially located visual indicia means on the peripheral surface of said drum, said indicia means being divided into three different color zones extending over substantially equal area zones on said peripheral surface, wall means having viewing window means therein, said wall means and viewing window means being adjacent said drum and color zones and related in size thereto so that one of said colors at a time may be viewed through said window means, means on said drum maintaining said drum in a central position so that the middle color zone normally will be viewable through said window means, a plurality of vanes on each end of said drum, means to direct a flow of fluid onto the vanes on one end of said drum to rotate the drum in one direction away from its central position, means to direct a flow of fluid on the vanes of the other end of said drum to rotate the drum in the other direction and away from its central position, and control means for selectively feeding a flow of fluid into one or the other of said nozzles to turn said drum in one direction or the other.

* * * * *

UNITED STATES PATENT OFFICE
CERTIFICATE OF CORRECTION

Patent No. 3,643,620     Dated February 22, 1972

Inventor(s) Peter A. Penny

It is certified that error appears in the above-identified patent and that said Letters Patent are hereby corrected as shown below:

Column 4, line 44, before "means" insert --first--;
Column 4, line 44, after "means" insert --including a nozzle--;
Column 4, line 66, before "means" insert --second--;
Column 4, line 66, after "means" insert --Including a nozzle--.

Signed and sealed this 17th day of October 1972.

(SEAL)
Attest:

EDWARD M. FLETCHER, JR.
Attesting Officer

ROBERT GOTTSCHALK
Commissioner of Patents